(12) United States Patent
Nick

(10) Patent No.: US 10,180,283 B2
(45) Date of Patent: Jan. 15, 2019

(54) CENTRIFUGAL MACHINE FOR DRYING GRANULAR SOLID MATERIALS

(76) Inventor: Josef Andreas Nick, Bauru (BR)

( * ) Notice: Subject to any disclaimer, the term of this patent is extended or adjusted under 35 U.S.C. 154(b) by 784 days.

(21) Appl. No.: 14/115,378

(22) PCT Filed: May 12, 2011

(86) PCT No.: PCT/BR2011/000137
§ 371 (c)(1),
(2), (4) Date: Feb. 3, 2014

(87) PCT Pub. No.: WO2012/149616
PCT Pub. Date: Nov. 8, 2012

(65) Prior Publication Data
US 2014/0373378 A1 Dec. 25, 2014

(30) Foreign Application Priority Data
May 3, 2011 (BR) ..................................... 1102511

(51) Int. Cl.
*F26B 17/30* (2006.01)
*F26B 25/00* (2006.01)
(Continued)

(52) U.S. Cl.
CPC ............ *F26B 17/30* (2013.01); *A23N 12/086* (2013.01); *B04B 3/04* (2013.01); *B04B 11/02* (2013.01);
(Continued)

(58) Field of Classification Search
CPC ................................ A23N 12/086; F26B 5/08
See application file for complete search history.

(56) References Cited

U.S. PATENT DOCUMENTS 557,939 A * 4/1896 Ayau .......................... B04B 3/04
                                                                210/374
569,677 A * 10/1896 Snider ....................... B04B 3/04
                                                                210/374
(Continued)

FOREIGN PATENT DOCUMENTS

BR        PI 0201900-0 A      9/2002
BR        PI 0304448-3 A      5/2005
(Continued)

OTHER PUBLICATIONS

International Searching Authority, International Search Report and Written Opinion for International Application No. PCT/BR2011/000137, dated Apr. 25, 2012, 27 pages, European Patent Office, The Netherlands.
(Continued)

*Primary Examiner* — Kenneth Rinehart
*Assistant Examiner* — Logan P Jones
(74) *Attorney, Agent, or Firm* — Alston & Bird LLP

(57) ABSTRACT

The present invention relates to a centrifugal machine (1) for drying granular solid materials, comprising a hopper (2), a centrifuging mechanism (3), associated to the hopper (2), provided with a rotary helical device (6) enabling the transport of the granular solid materials. Said centrifuging mechanism (3) is also provided with a perforated rotary piece (7), surrounding the rotary helical device (6) configured to remove, by centrifugal force, free liquids adhered to the surface of the granular solid materials. Additionally, the machine (1) comprises a solid outlet duct (5) and a solid collecting chamber (8), arranged between the centrifuging mechanism (3) and the solid outlet duct (5), capable of receiving the centrifuging granular solid materials from the rotary piece (7). The solid collecting chamber (8) is provided with a solid conducting rotor (9), which comprises radial blades (10) configured to push the granular solid materials
(Continued)

and impart an increase in tangential velocity to them. The rotary helical device (6) and the rotary piece (7) are configured to allow adjustments of angular velocity.

9 Claims, 14 Drawing Sheets

(51) Int. Cl.
    *F26B 25/14*     (2006.01)
    *B04B 3/04*     (2006.01)
    *B04B 11/02*     (2006.01)
    *F26B 5/08*     (2006.01)
    *A23N 12/08*     (2006.01)

(52) U.S. Cl.
    CPC ............... *F26B 5/08* (2013.01); *F26B 25/001* (2013.01); *F26B 25/14* (2013.01)

(56) References Cited

U.S. PATENT DOCUMENTS

| | | | | |
|---|---|---|---|---|
| 617,158 A | * | 1/1899 | Henderson | B04B 3/04 |
| | | | | 210/374 |
| 1,336,722 A | * | 4/1920 | Behr | B04B 3/04 |
| | | | | 210/370 |
| 1,541,163 A | | 4/1920 | Westhafer et al. | |
| 1,756,194 A | * | 4/1930 | Haug | B04B 3/04 |
| | | | | 210/374 |
| 1,804,108 A | * | 5/1931 | Pardo | B04B 3/04 |
| | | | | 210/374 |
| 1,829,547 A | * | 10/1931 | Sharples | B04B 3/04 |
| | | | | 210/198.1 |
| 3,494,472 A | * | 2/1970 | Quetsch | B04B 3/04 |
| | | | | 210/374 |
| 3,754,660 A | * | 8/1973 | Cottrell | A23N 1/00 |
| | | | | 210/374 |
| 4,135,659 A | | 1/1979 | Derton et al. | |
| 4,267,964 A | * | 5/1981 | Williams | B04B 11/02 |
| | | | | 415/88 |
| 5,948,271 A | * | 9/1999 | Wardwell | B04B 1/20 |
| | | | | 210/143 |

FOREIGN PATENT DOCUMENTS

| | | |
|---|---|---|
| BR | PI 0502946-5 A | 3/2007 |
| DE | 8535469 U1 | 12/1986 |
| FR | 1296799 A1 | 6/1962 |
| FR | 2635989 A1 | 3/1990 |
| JP | 58-157631 A | 9/1983 |

OTHER PUBLICATIONS

International Preliminary Examining Authority, International Preliminary Report on Patentability for International Application No. PCT/BR2011/000137, including Applicant's Mar. 1, 2013 response to the Apr. 25, 2012, Written Opinion of the ISA, completed Jul. 19, 2013, 17 pages, European Patent Office, The Netherlands.

* cited by examiner

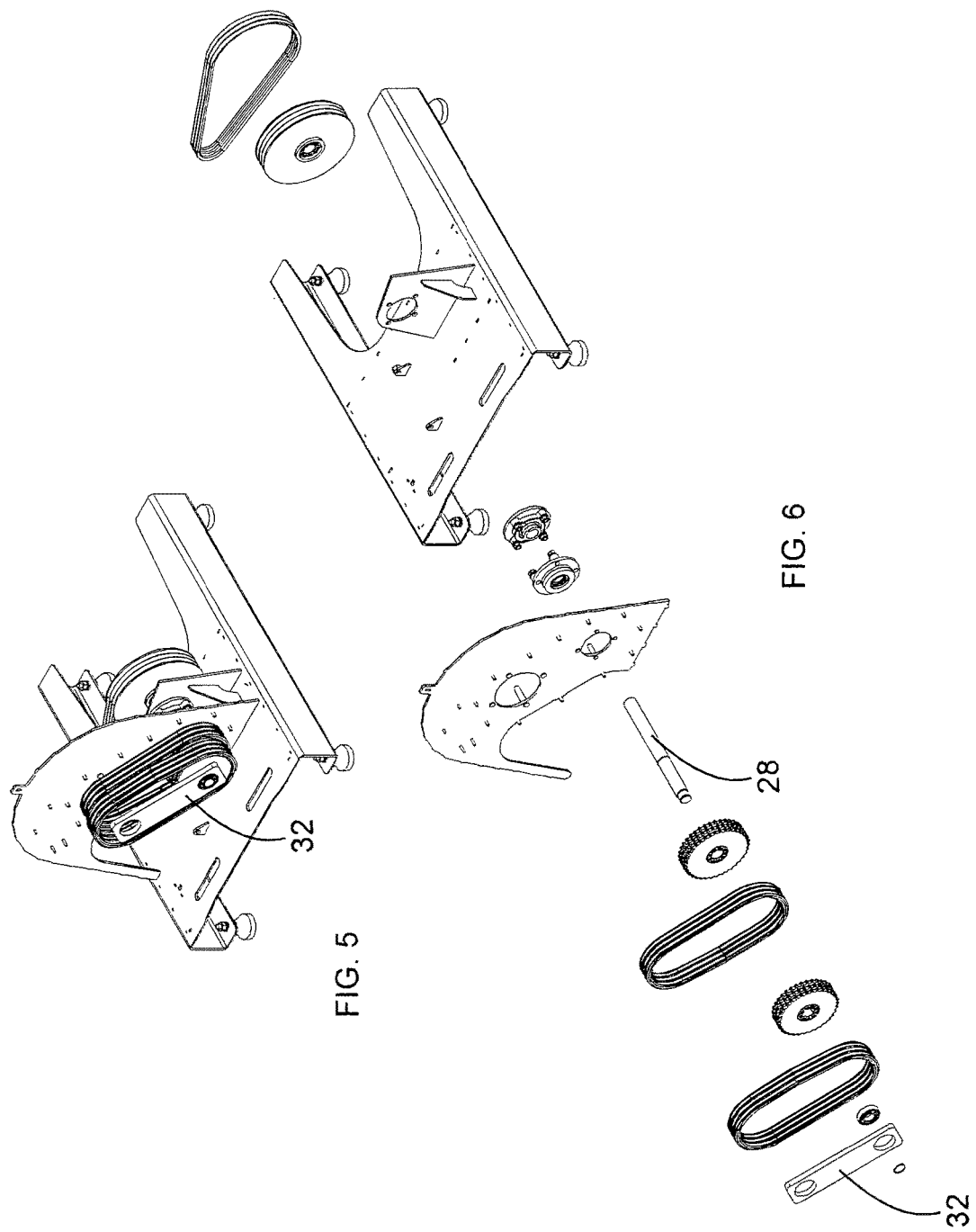

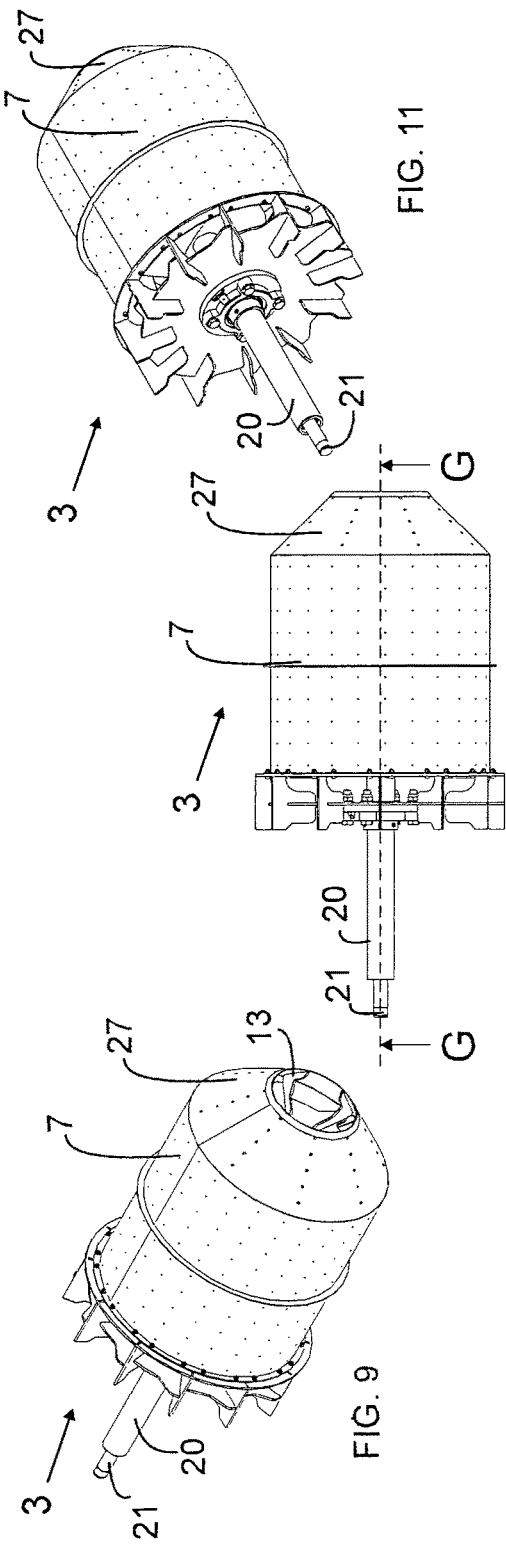

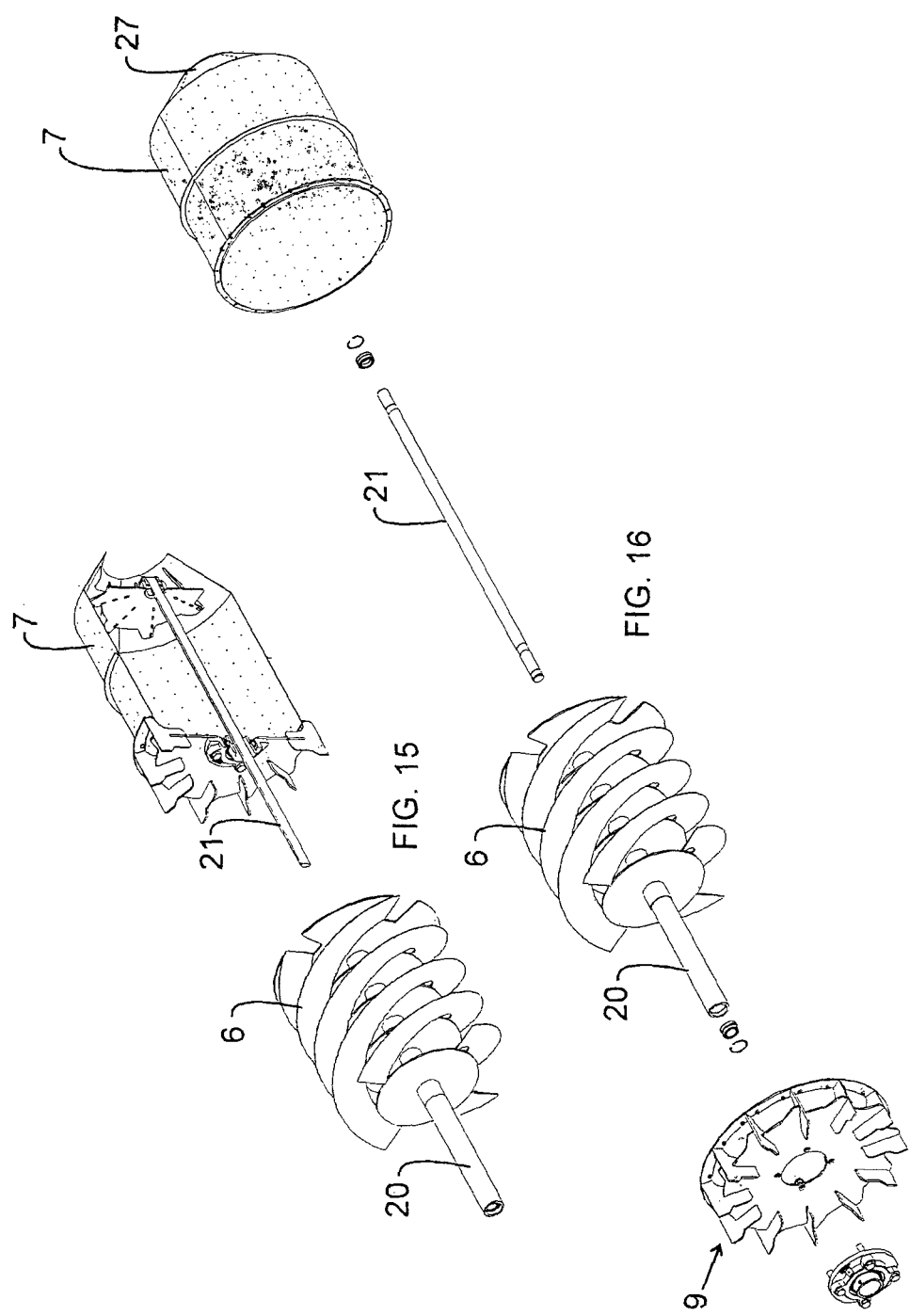

CENTRIFUGAL MACHINE FOR DRYING GRANULAR SOLID MATERIALS

CROSS REFERENCE TO RELATED APPLICATIONS

This application is a national stage application, filed under 35 U.S.C. § 371, of International Application No. PCT/BR2011/00137, filed May. 12, 2011, which claims priority to Brazilian Application No. PI1102511-5, filed May. 3, 2011, the contents of both of which are hereby incorporated by reference in their entirety.

BACKGROUND OF THE INVENTION

Related Field

The present invention relates to a centrifugal machine for solid materials with granular characteristics, which aggregates the function of carrying them in a reliable, safe and effective manner. Particularly, the present invention relates to a compact centrifugal machine of continuous flow, capable of removing liquids from granular solid materials, as well as of carrying the previously centrifuged materials in directions, distances and heights configured according to the demand for application, further preventing damages thereof, without impairing the efficacy of the centrifuging process.

Description of Related Art

Coffee beans are the type of granular solid material consisting of one of the main products of the world agribusiness. For this reason, one constantly looks for technique and solutions capable of reducing production costs and that, in addition, provides a final product of high quality and which meets the requirements for export.

In this regard, one of the main factors that influence the quality of coffee is the way of handling/treating it in the processing that follows harvest, chiefly at the drying step, which consists in evaporating the moisture present on the exposed surface of the coffee beans. It should be noted that coffee growing has post-harvest steps that cause the coffee beans to pass through a moist route initially.

Thus, drying is a quite important step in the process of treating coffee beans, in order to obtain a final product of high quality, since the ripe coffee beans are highly perishable due to the conditions of high moisture at harvest time. If the coffee beans are kept under conditions of high moisture for a given period of time, fungi begin to develop on the surface of the beans, which, coupled to the increase in respiration rate and temperature rise, will lead to fermentation. So, important characteristics of coffee such as aroma and taste deteriorate, that is, the quality of the final product is significantly affected.

Usually, the drying of coffee beans is carried out manually, in house yards, such as trodden-earth, cement or asphalt floor. However, this method is susceptible to weather variations, which may impair its efficacy, since at low temperatures and/or on a high level of moisture the dying time increases, causing damages to the coffee-growers. Besides, the drying on trodden-earth yards usually requires a relatively long time for carrying out the process and further requires large areas for building them. Additionally, it is also necessary to hire labor for conducting the drying process. Such factors contribute decisively to enriching the final product.

On the other hand, there are already a few techniques used for reducing the time it takes to remove water from the surface of the coffee beans, through automated machines such as mechanical dryers or similar equipment.

For instance, Brazilian patent application PI 0201900-0 describes a machine intended for removing excess water from the surface of the coffee beans by the principle of evaporation, by means of a forced hot-air stream capable of passing through the layer of grains that float on a perforated surface.

Another known automated solution for drying coffee beans is centrifugation, which consists of a technique based on the application of a centripetal force that is greater than gravity and can be increased by raising the rotation velocity. Centrifugation is a technique often used in the industries for separating solid from liquid, liquid from gaseous or still for separating two types of liquids.

For instance, Brazilian patent application PI 0304448-3 relates to a centrifuge capable of removing surface water and/or coffee-been wash water. Such a centrifuge comprises a drum with the shape of a horizontal truncated cone, constituted by a perforated metal plate, the rotation of which is controlled. This centrifuge has the limitation that it is not possible to control exactly the residence time of the product and centrifugation effect. Besides, the effectiveness of its functioning depends directly on the beans having good rolling characteristics, since they should roll inside the cone trunk until they reach the outlet without the aid of any specific device. Since the coffee beans not always have good rolling characteristic, there is a non-negligible chance of clogging the centrifugal machine, which restricts the use thereof to a limited range of granular materials, namely: those that have a rounded shape and greater rigidity.

Patent application PI 0502946-5 describes a centrifugal machine for coffee beans, provided with a vertical axle having a lower portion with an inlet for the coffee beans, which in turn are carried to an upper portion of the vertical axle by means of two endless screws that rotate in clockwise and counterclockwise direction. In addition, the centrifuge has a cylindrical sieve capable of permitting the liquid phase of the centrifuged material to come out, which involves the endless screws. Additionally, the centrifuge further comprises a cylinder that involves the cylindrical sieve to lead the liquid out of the machine. It should be noted that the rising flow of coffee beans in this machine is forced by the action of the endless screws from the bottom of the machine to its top, which generates an excess pressure on the coffee beans, resulting in a significant percentage of damaged grains. For this reason, it is recommended in the specification of this application that moderate rotation be adopted in order to balance the benefit of removing surface water with a lower percentage of damaged beans, which naturally impairs the efficacy of the machine.

Therefore, the presently known centrifugal machines are not capable of meeting satisfactorily all the requirements of coffee growing, so as to enable the replacement of manual methods that are sill often used at present. In other words, there is a demand for technologies that are capable of optimizing the process of drying coffee beans, in order to increase the production scale, while maintaining the quality of the product, coupled with a relatively low cost.

BRIEF SUMMARY

The objectives of the present invention consist in providing an automated machine, capable of providing drying of the surface of granular solid materials (for example, coffee beans), in an automated and optimized manner, in order to provide higher output, effectiveness and rapid processing, compatible with a great production scale demand.

Besides, the objectives of the invention further consist in providing an automated machine, capable of providing drying of surface of granular solid materials (for example coffee beans), having a compact constructive arrangement, exhibiting easy and simple installation and integration with the other equipment/machines/devices involved in the process of treating and handling these granulated solid materials.

Additionally, the objectives of the present invention consist in providing a machine capable of removing surface liquids from granular solid materials (for example, coffee beans), as well as carrying such materials previously centrifuged in multiple directions, distances and heights configurable according to the demand for application.

Further, the objectives of the present invention consist in providing a machine capable of removing liquids from the surface of granular solid materials, as well as carrying such previously centrifuged materials so as to prevent or minimize damage to them, thus eliminating or minimizing waste without impairing the output, efficacy and processing speed.

A first way to achieve one or more of the objectives of the present invention is through a centrifugal machine for granulate solid materials, which comprises at least one hopper capable of enabling the entry of the granular solid materials. Besides, the centrifugal machine also comprises at least one centrifuging mechanism associated to the hopper, provided with at least one rotary helical device capable of enabling the transport of the granular solid materials. Such a centrifuging mechanism is further provided with a perforated rotary piece, which involves the rotary helical device externally. Said rotary piece is configured to remove by centrifugal force free liquids adhered to the surface of the granular solid materials. Additionally, the centrifugal machine comprises at least one outlet duct for solids, associated to the centrifuging mechanism, capable of enabling the centrifuged granular solid materials to come out. Further, the centrifugal machine comprises at least one solid collecting chamber, arranged between the centrifuging mechanism and the outlet duct for solids, capable of receiving the centrifuged granular solid materials from the rotary piece. Said solid collecting chamber is provided with a solid conducting rotor, which comprises radial blades configured to pull the granular solid materials and impart a tangential increase in velocity to them.

A second way of achieving one or more of the objectives of the present invention is through a centrifugal machine for granulate solid materials, which comprises at least one hopper capable of enabling the entry of the granular solid materials. Besides, the centrifugal machine also comprises at least one centrifuging mechanism associated to the hopper, provided with at least one rotary helical device capable of enabling the transport of the granular solid materials. Such a centrifuging mechanism is further provided with a perforated rotary piece, which involves the rotary helical device externally. Said rotary piece is configured to remove by centrifugal force free liquids adhered to the surface of the granular solid materials. Additionally, the centrifugal machine comprises at least one outlet duct for solids, associated to the centrifuging mechanism, capable of enabling the centrifuged granular solid materials to come out. Further, the centrifugal machine comprises at least one driving mechanism, associated to the centrifuging mechanism, capable of enabling rotation of the rotary helical device and of the rotary piece around their central axis. Additionally, the centrifugal machine comprises at least one main chassis capable of housing the driving mechanism. Besides, the centrifugal machine comprises a set of bearings arranged inside the main chassis, capable of enabling support of the centrifuging mechanism.

A third way of achieving objectives of the present invention is through a centrifugal machine for granulate solid materials, which comprises at least one hopper capable of enabling the entry of the granular solid materials. Besides, the centrifugal machine also comprises at least one centrifuging mechanism associated to the hopper, provided with at least one rotary helical device capable of enabling the transport of the granular solid materials. Such a centrifuging mechanism is further provided with a perforated rotary piece, which involves the rotary helical device externally. Said rotary piece is configured to remove by centrifugal force free liquids adhered to the surface of the granular solid materials. Additionally, the centrifugal machine comprises at least one outlet duct for solids, associated to the centrifuging mechanism, capable of enabling the centrifuged granular solid materials to come out. Further, the centrifugal machine comprises at least one driving mechanism, associated to the centrifuging mechanism, capable of enabling rotation of the rotary helical device and of the rotary piece. Said rotary helical device is associated to the driving mechanism by means of a first central axle comprised by the centrifugal machine. Said rotary piece is associated to the driving mechanism by means of a second central axle, also comprised by the centrifugal machine, arranged internally and concentrically with the first central axle. The first central axle and the second central axle are turnable by the driving mechanism independently of each other, the driving mechanism being configured to provide a specific angular velocity adjustment for the rotary helical device around its central axis through the first central axis; and further configured to provide specific angular velocity adjustment for the rotary piece around its central axis through the second central axle.

BRIEF DESCRIPTION OF THE FIGURES

The present invention will now be described in greater detail with reference to the attached drawings, in which:

FIG. 5 represents a perspective view of a sub-assembly of a transmission mechanism of the machine illustrated in FIG. 1;

FIG. 6 represents an exploded view of the sub-assembly illustrated in FIG. 5;

FIG. 9 represents a perspective front view of the centrifugation mechanism of the machine illustrated in FIG. 1;

FIG. 10 represents a side view of the centrifugation mechanism of the machine illustrated in FIG. 1;

FIG. 11 represents a perspective back view of the centrifugation mechanism of the machine illustrated in FIG. 1;

FIG. 12 represents a perspective front view of the centrifugation mechanism of the machine illustrated in FIG. 1, according to a partial section G-G in FIG. 10;

FIG. 13 represents a side view of the centrifugation mechanism of the machine illustrated in FIG. 1, according to the partial section G-G in FIG. 10;

FIG. 14 represents a perspective back view of the centrifugation mechanism of the machine illustrated in FIG. 1, according to the partial section G-G in FIG. 10;

FIG. 15 represents an exploded view of the configuration mechanism of the machine illustrated in FIG. 1 in sub-assemblies;

FIG. 16 represents an exploded view of the centrifugation mechanism of the machine illustrated in FIG. 1 in parts and pieces;

DETAILED DESCRIPTION OF VARIOUS EMBODIMENTS

Figure 1:
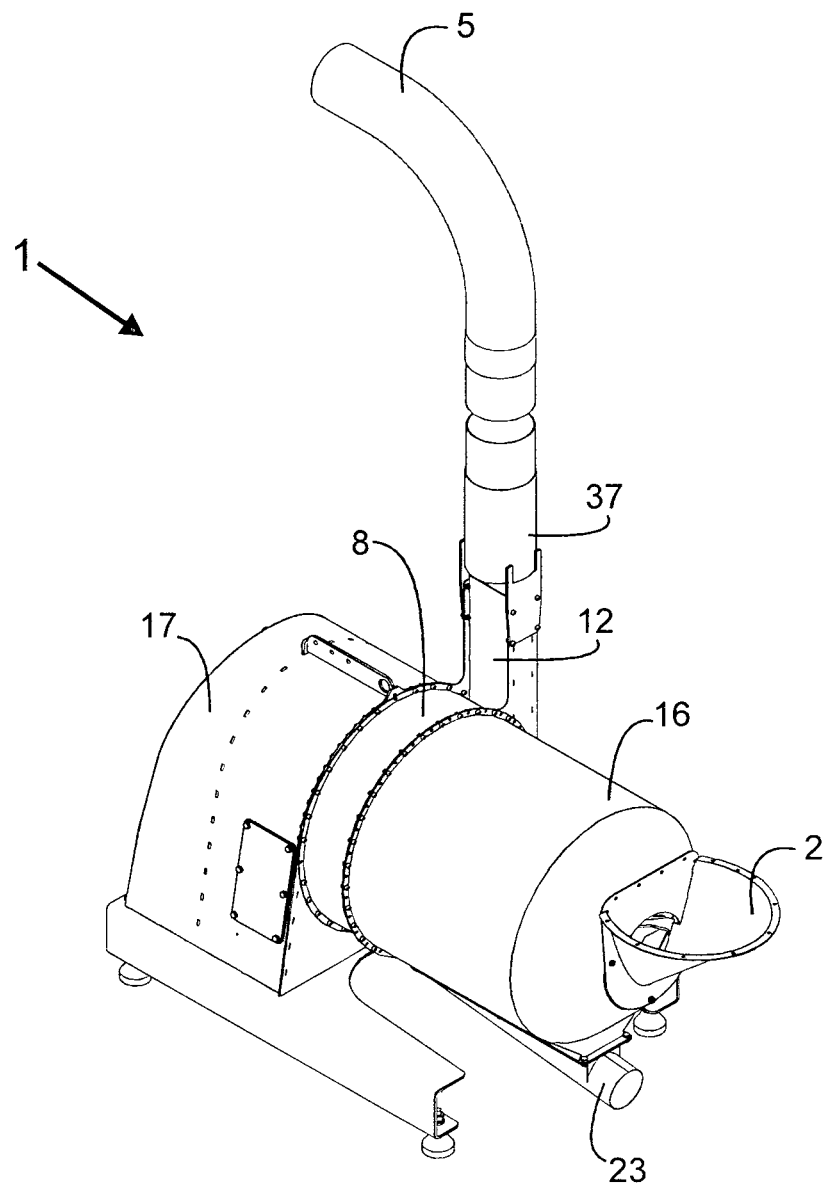
FIG. 1 represents a perspective view of a centrifugal machine for granular solid materials according to a preferred embodiment of the present invention.

FIG. 1 illustrates a perspective view of a centrifugal machine 1 for granular solid materials according to a preferred embodiment of the present invention. Such granular solid materials consist preferably of coffee beans. However, it should be understood that any types of solid materials with granular characteristic or behavior can be treated by the machine 1 of the present invention, such as for example seeds, various vegetable bagasse, granular synthetic materials, bran, fibrous chips, pellicles, etc. As already mentioned before, in some applications it is desirable that these granular solid materials be free from moisture (liquid portion, arranged externally and/or permeating the solid material). Naturally, in order for this ideal condition to be achieved, it is necessary to use a technical solution capable of removing the moisture from the granular solid materials. In the present invention, this technical solution consists of the novel arrangement/embodiment of the centrifugal machine 1 illustrated in FIGS. 1 to 30.

The machine 1 comprises at least one hopper 2 capable of enabling the entry of the granular solid materials coming from any external source. This hopper 2 is preferably fixed to the machine 1 by a flange and can be easily replaced by other variants that will be suitable for the needs of each application. Besides, the hopper 2 is positioned at a reduced height (e.g. about 700 mm) with respect to the apparatus base, which facilitates its connection with the external source, often preventing the need to raise the granular solid materials previously. In addition, the hopper 2 has a strong inclination to the inside of the machine 1, which prevents accumulation of rests of granular solid materials and the possible need to push them during or at the end of each service. Generally speaking, the hopper 2 has the shape of an "inclined cone slice", the inclination in its central line being smaller, corresponding to about 40 geometrical degrees. In most of the hopper 2 the inclination increases gradually until it reaches about 80 geometric degrees. It is important to note that the side of the machine 1, through which the granular solid materials to be centrifuged go in, is free from support elements, axles, bearings or transmission, which facilitates the approximation with external pieces of equipment, chiefly in reduced spaced.

As can be seen in FIGS. 2, 12, 13 and 14, the machine 1 also comprises at least one centrifuging mechanism 3, associated to the hopper 2, provided with at least one rotary helical device 6 capable of enabling the transport of the granular solid materials. Besides, the centrifuging mechanism 3 is provided with a rotary perforated piece 7, which involved the rotary helical device 6 externally. The rotary piece 7 may have a cylindrical shape, as shown in the drawings, or a slightly conical shape. It may also have the shape of a basket or revolving drum.

The rotary cylinder 7 is configured to remove by centrifugal force free liquids adhered to the surface of the granular solid materials, providing the centrifugation proper. Thus, the rotary cylinder 7 retains the solids, but allows the liquid to flow through its orifices. Preferably, the rotary helical device 6 is installed concentrically and tightly with respect to the rotary cylinder 7, which prevents the granular solid materials from being pressed and crushed by its movement. The rotary helical device 6 turns in the same direction as the rotary cylinder 7 and has the function of conducting, pushing and transporting the granular solid materials along an internal wall of the rotary cylinder 7 in a directional way. Besides, the rotary helical device 6 is provided with pitches that can be dimensioned according to the need and the type of granular solid material. For instance, for a given type, it may be necessary to use a smaller or larger pitch, according to its characteristics, such as fragility/rusticity/light/heavy, sliding/rough, etc.—the use of a smaller pitch implies an increase in the residence type of the granular solid materials inside the rotary cylinder 7. Analogously, one may also alter the length of the rotary cylinder 7 according to the needs of each application—the use of a longer length implies an increase in the residence time of the granular solid materials inside the rotary cylinder 7.

Figure 2:
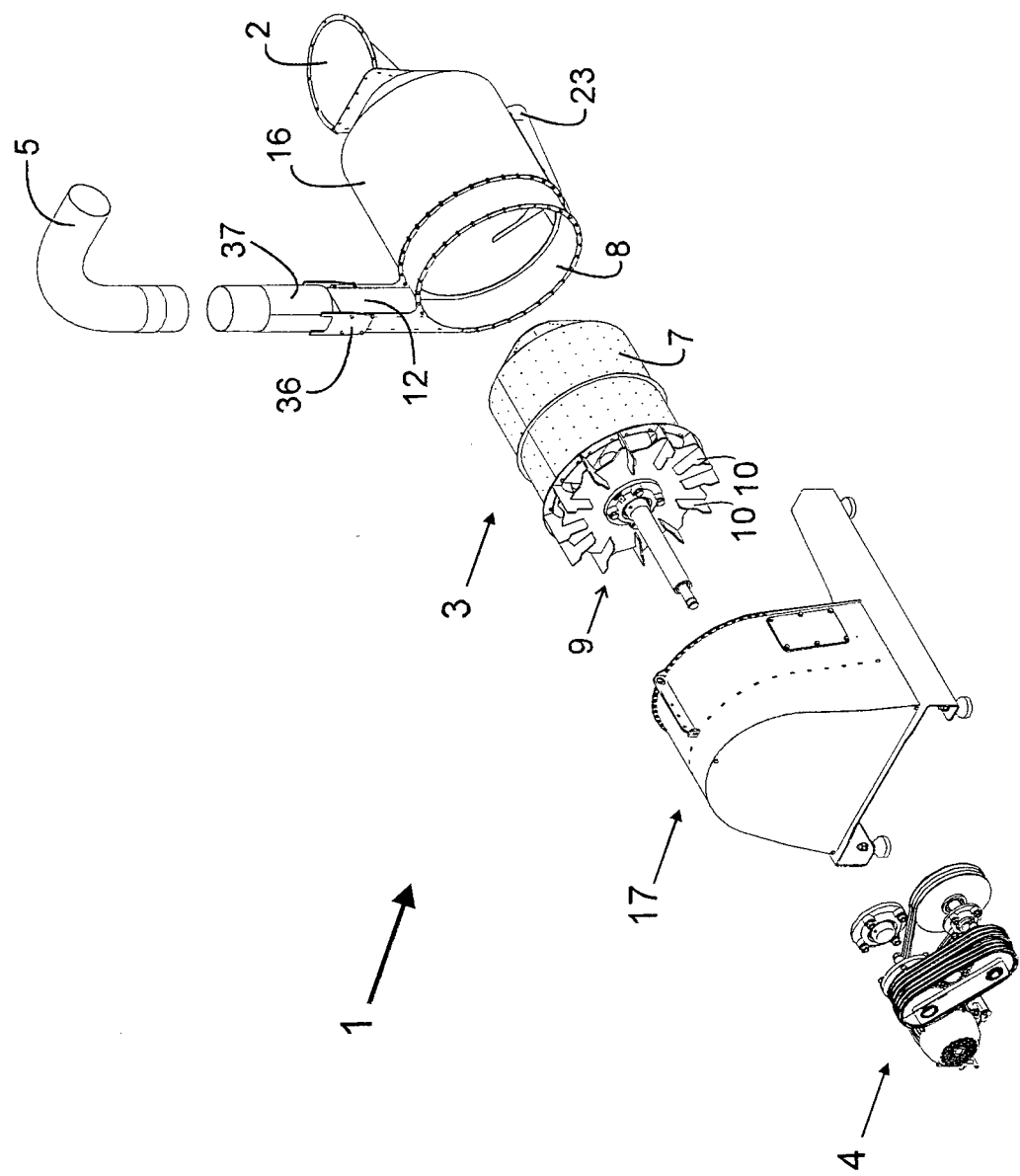
FIG. 2 represents an exploded view of the machine illustrated in FIG. 1.
Figure 25:
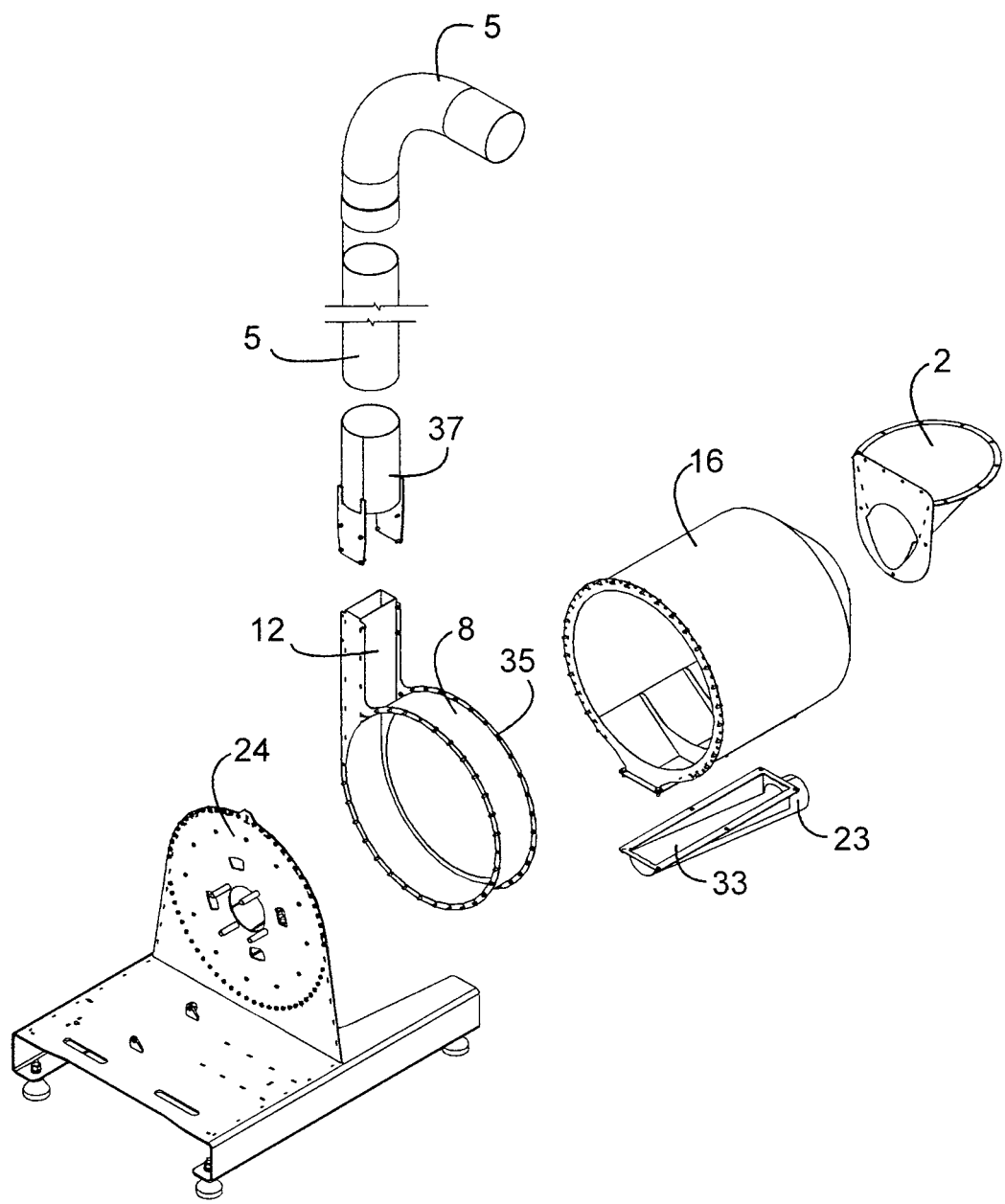
FIG. 25 represents an exploded view of a sub-assembly formed by conducting ducts, one as outlet for solids, one duct as outlet for liquids, a solid collecting chamber, a liquid collecting chamber, a hopper, a support and a fixation panel.
Figure 26:
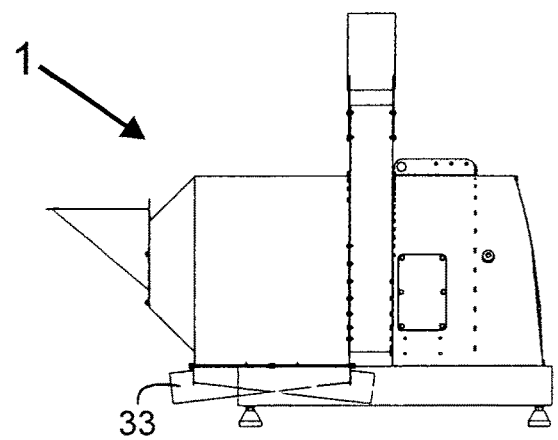
FIG. 26 represents a side view of the machine illustrated in FIG. 1, illustrating variations in position of its liquid pouring chute.

As shown in FIGS. 1, 2 and 25, the machine 1 also comprises at least one outlet duct for solids 5, associated to the centrifuging mechanism 3, capable of enabling the centrifuged granular solid materials to come out.

Figure 3:
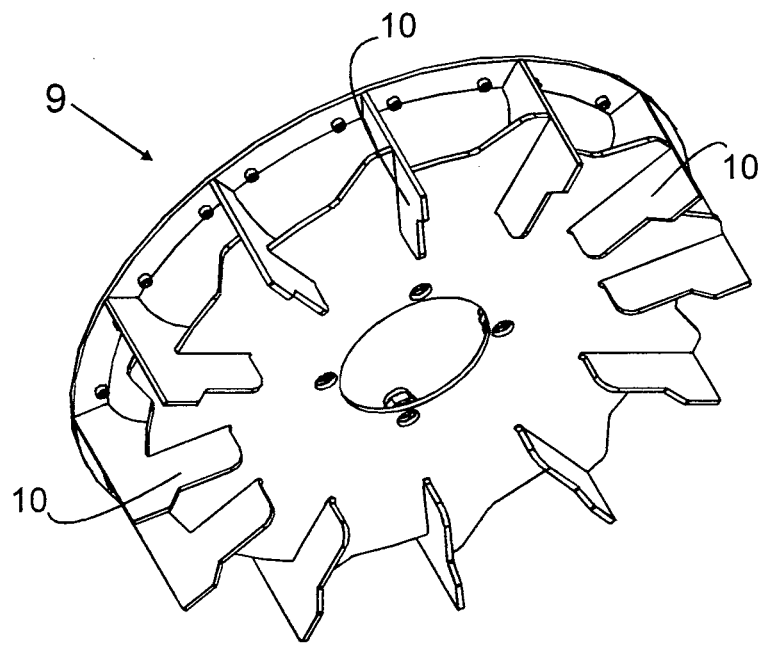
FIG. 3 represents a perspective view of a solid conducting rotor of the machine illustrated in FIG. 1.

Further according to FIGS. 1, 2, 25, 29 and 30, the machine 1 also comprises at least one solid collecting chamber 8, arranged between the centrifuging mechanism 3 and the outlet duct for solids 5. Such a solid collecting chamber 8, capable of receiving the granular solid materials centrifuged from the rotary cylinder 7, is provided with a solid conducting rotor 9, which comprises radial blades 10 configured to pushes the granular solid material and impart to them an increase in tangential velocity, as can be seen in FIGS. 2 and 3. This increase in tangential velocity inside the solid collecting chamber 8 is also provided by the size of its radius, being larger with respect to the radius of the rotary cylinder 7 by about 10%. Thus, considering that the angular velocities of the granular solid materials in the solid collecting chamber and of the rotary cylinder 7 are substantially the same, the increase in tangential velocity is proportional to the increase of the radius of the solid collecting chamber 8, enabling a high processing capacity. It should be noted that the solid conducting rotor 9 is fixed to a back end of the rotary cylinder 7, so that said rotary cylinder 78 accounts for the rotation of the solid conducting rotor 9.

Figure 30:
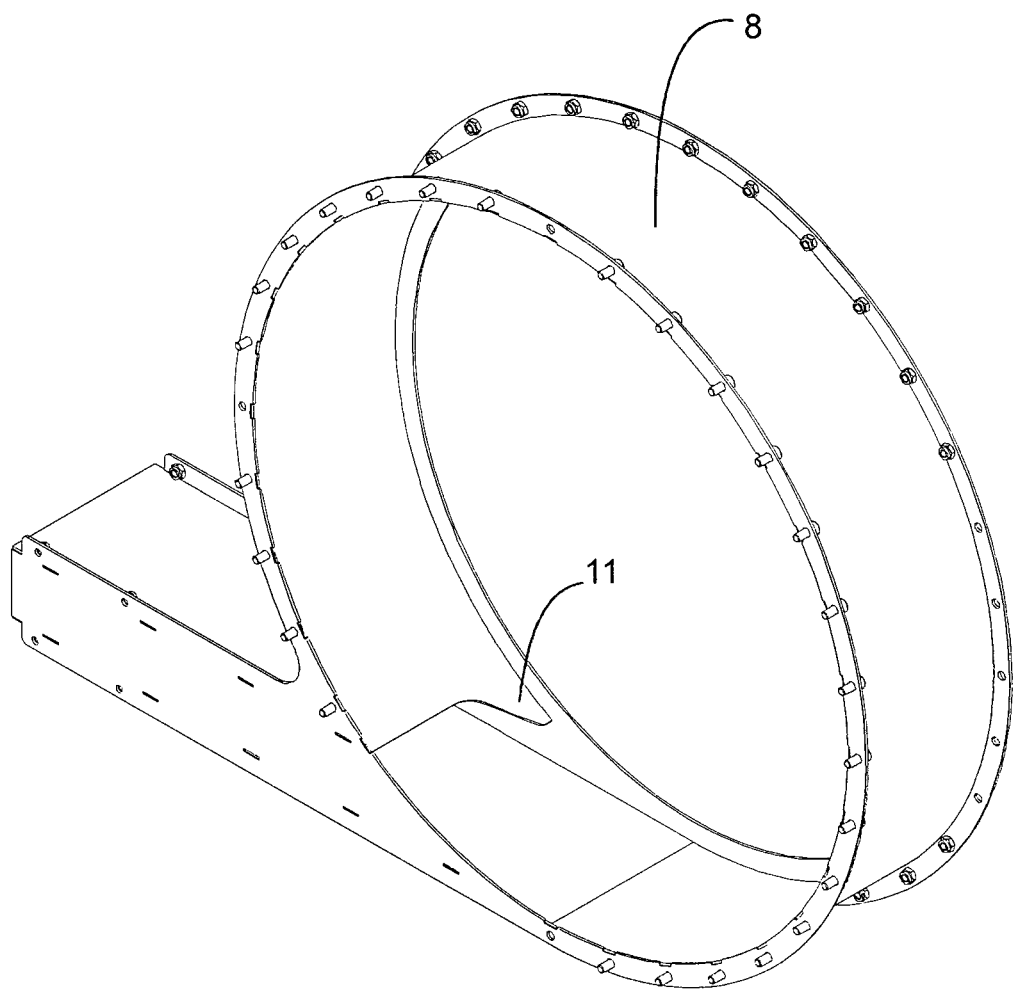
FIG. 30 represents a perspective view of the solid collecting chamber illustrated in FIG. 1, pointing out its internal portion.

Preferably, the solid collecting chamber 8 comprises an inner wall provided with an end projection 11 substantially curved, capable of preventing damage to the granular solid materials upon rotation of the solid conducting rotor 9, as can be seen in FIG. 30. Therefore, this specific configuration of the solid collecting chamber 8 guarantees the physical integrity of the granular solid material transported, unlike the centrifugal machines known at present. By virtue of this, one eliminates or minimizes waist without impairing the output, effectiveness and processing speed.

The machine 1 further comprises at least one solid conducting rotor 12, associated in a fixed manner to the solid collecting chamber 8 and to the solid outlet duct 5, and being arranged between these two elements. This solid conducting duct 12 is capable of leading centrifuged granular materials coming from the solid collecting chamber 8 to the solid outlet duct 5. It should be noted that it is possible to implement connections, accessories and adapters of different types, sizes and shapes (rectangular, circular, etc.) between the solid conducting duct 12 and the solid outlet duct 5, in order to provide greater facility of fitting the pieces together and better integration of the machine 1 with the destination of the granular solid materials. The solid conducting duct 12, preferably constituted by a metallic material, is provided with side flanges 36 that can be fixed to the outlet of the solid collecting chamber 8. Besides, the solid conducting duct 12 is provided with a cylindrical sheath 37, the function of which is to receive the solid outlet duct 5, preferably constituted by PVC, snap-fitting. Said side flanges 36 support the cylindrical sheath 37 with some spacing from the outlet of the solid collecting chamber 8, so that the granular solid materials take a free flight in this segment. So, in case of a possible clogging of the solid outlet duct 5, the granular solid materials can be expelled through this opening, without clogging of the solid collecting chamber 8.

Figure 27:
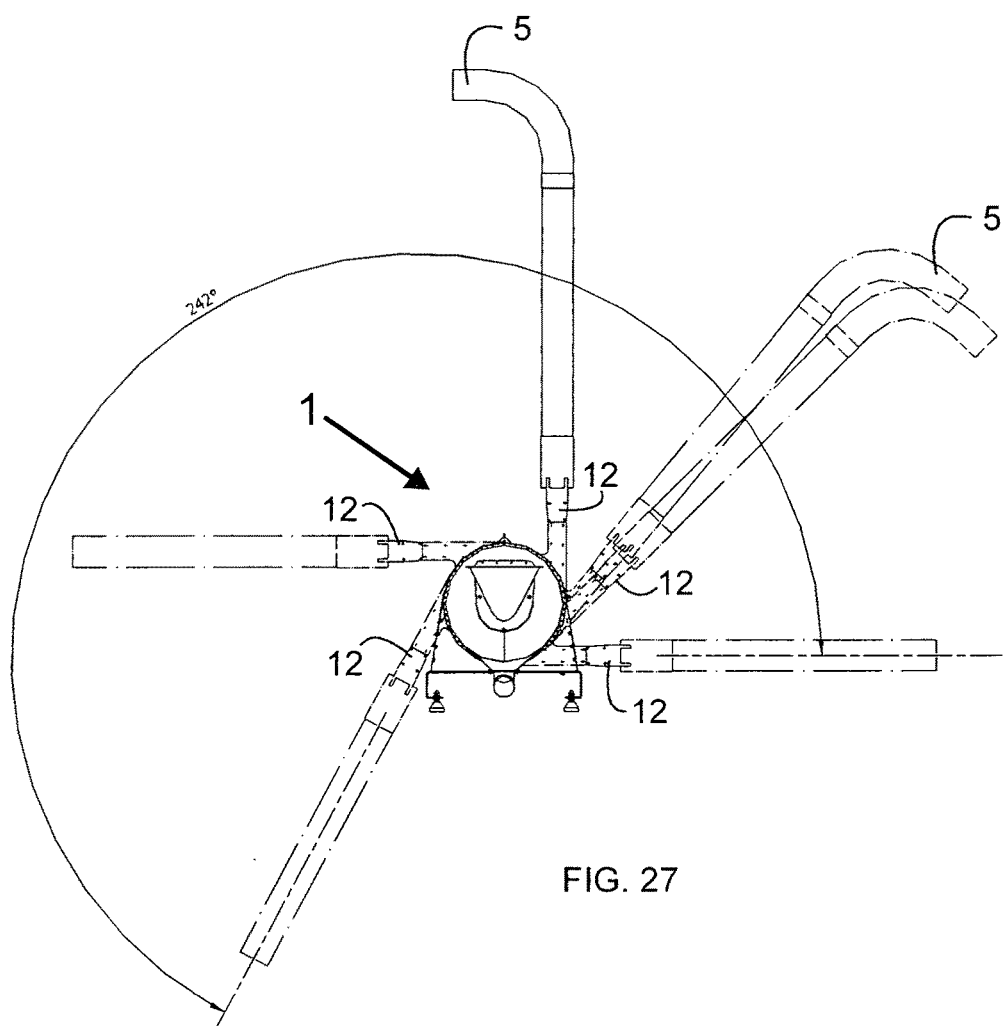
FIG. 27 represents a front view of the machine illustrated in FIG. 1, illustrating variations in position of its solid collecting chamber.

According to FIGS. 1, 2, 25 and 29, the machine 1 also comprises at least one liquid collecting chamber 16, which involves the rotary cylinder 7 concentrically and externally. First, the solid collecting chamber 8 is rotary with respect to the liquid collecting chamber 16, so that this rotation enables the configuration of the angular position of the solid conducting duct 12 and of the solid outlet duct 5, as shown in FIG. 27, thus providing greater versatility, flexibility of use and adaptability to the environment in which the machine 1 is installed. It should be noted that the angular variation of the assembly (solid conducting duct 12 and solid outlet duct 5) can reach up to 360 degrees with respect to the axis, having the composition illustrated in the project with capacity to reach 242 degrees. If the centrifuged solid granular materials depend on the direction angle of the solid outlet duct 5, they will follow a ballistic path in which they will reach the longest vertical or horizontal distance, in order to reach the next point of interest.

FIGS. 1, 2 and 25 show that the machine 1 also comprises at least one liquid-material outlet duct 23, associated to the liquid collecting chamber 16, capable of enabling drainage of the liquid resulting from the centrifugation out of the machine 1. Preferably, the liquid material outlet duct 23 has an angular position that is configurable through the rotation of the liquid collecting chamber 16 with respect to the liquid collecting chamber 8. Preferably, the solid collecting chamber 8 supports the liquid collecting chamber 16 by means of its front flange 35, provided with a plurality of orifices arranged radially. In this way, the liquid collecting chamber 16 can be turned around its own axis to provide the best fixation position, which enables one to maintain the angular relationship between the solid collecting chamber 8 and the liquid collecting chamber 16 in their original configuration, regardless of the position chosen for the solid collecting chamber 8.

As can be seen in FIGS. 7 to 13, 16, 21 to 24, the machine 1 further comprises at least one rotary conical chamber 27, arranged between the hopper 2 and the rotary cylinder 7. The rotary conical chamber 27 is capable of receiving the granular solid materials coming from the hopper 2 and delivering them to the rotary cylinder 7. FIGS. 9, 12, 13, 22 to 24 illustrate the rotary conical chamber 27 provided with radial blades 13, also configured for providing an increase in tangential speed of the granular solid materials, so as to improve the processing capacity of the machine 1. These radial blades 13 are provided with projections configured with wedge shape, and such configuration can enable the retention of the granular solid materials inside the rotary conical chamber 27. Particularly, the angle of the edges of the radial blades 13 guides the incoming material always into the rotary conical chamber 27, not towards the outside. In this way, the radial blades 13 prevent the granular solid materials from being thrown out of the machine 1, so as to prevent waste.

Figure 18:
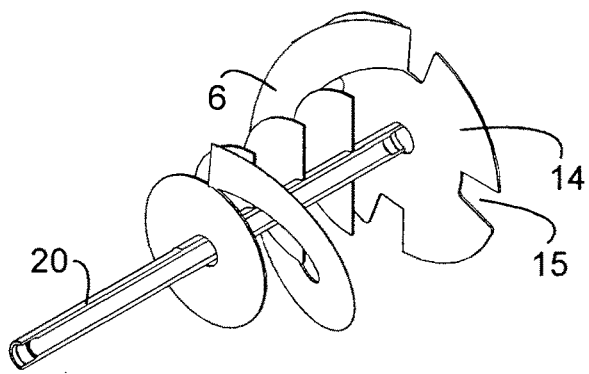
FIG. 18 represents a perspective back view of the set of helical devices of the centrifugation mechanism of the machine illustrated in FIG. 1, according to the partial section M-M in FIG. 17.
Figure 19:
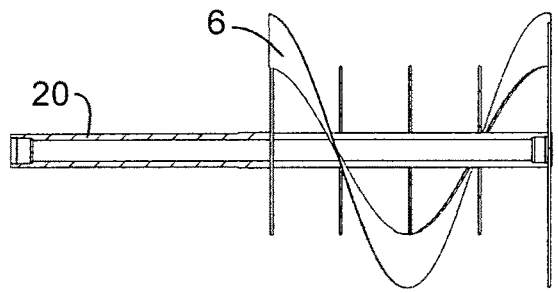
FIG. 19 represents a side view of the set of helical devices of the centrifugation mechanism of the machine illustrated in FIG. 1, according to the partial section M-M in FIG. 17.
Figure 20:
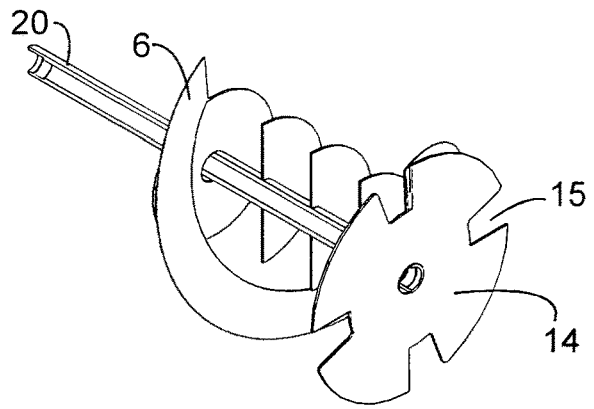
FIG. 20 represents a perspective front view of the set of helical devices of the centrifugation mechanism of the machine illustrated in FIG. 1, according to the partial section M-M in FIG. 17.
Figure 21:
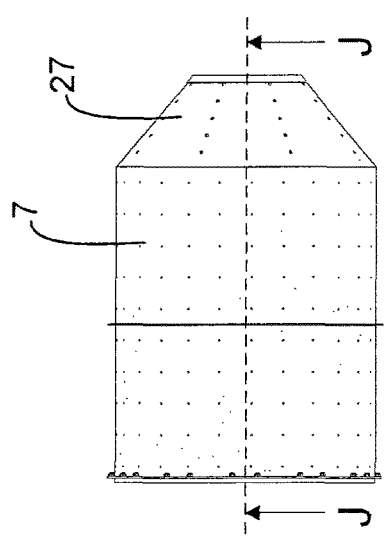
FIG. 21 represents a side view of a mounted sub-assembly of the machine illustrated in FIG. 1, which comprises a rotary conical chamber and a rotary cylinder.
Figure 24:
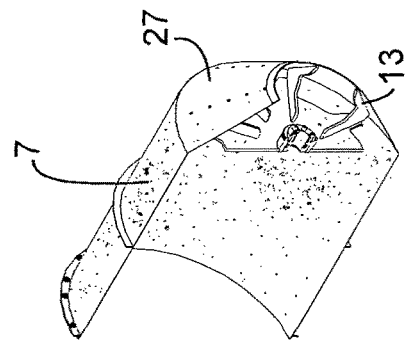
FIG. 24 represents a perspective front view of the mounted sub-assembly of the machine illustrated in FIG. 1, which corresponds the rotary conical chamber and the rotary cylinder, according to the partial section J-J in FIG. 21.
Figure 23:
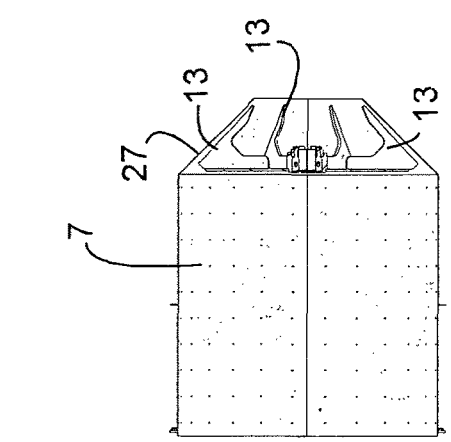
FIG. 23 represents a side view of the mounted sub-assembly of the machine illustrated in FIG. 1, which comprises the rotary conical chamber and the rotary cylinder, according to the partial section J-J in FIG. 21.
Figure 22:
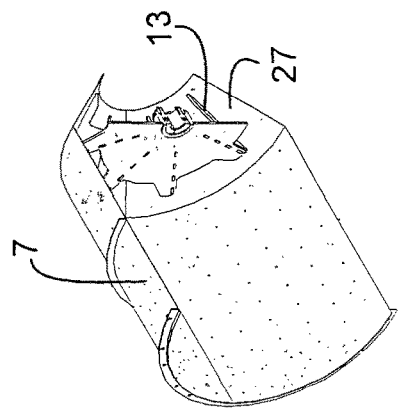
FIG. 22 represents a perspective back view of the mounted sub-assembly of the machine illustrated in FIG. 1, which comprises the rotary conical chamber and the rotary cylinder, according to the partial section J-J in FIG. 21.

The machine 1 further comprises a rotary front base-disc 14, arranged between the rotary conical chamber 27 and the rotary cylinder 7, as shown in FIGS. 12, 18 and 20. This rotary front base disc 14 is provided with at least one passageway opening 15, capable of enabling flow of the granular solid materials. Preferably, the rotary front base disc 14 comprises a plurality of passageway openings 15.

It should be noted that the differential angular velocity between the rotary front base disc 14 and the radial blades 13 is configurable so as to enable adjustment of the entry of the granular solid materials into the rotary cylinder 7. In other words, the rotary front base disc 14 and the radial blades 13 form an adjusting mechanism capable of enabling adjustment of the velocity of flow of the granular solid materials to be centrifuged. This adjustment is quite important, since it prevents a large amount of granular solid materials, larger than the processing capacity of the machine, from going into the rotary cylinder 7. Thus, in the event of excess material, said adjusting mechanism is capable of preventing overload of the machine 1, thus preventing clogging. In this regard, there is accumulation of granular solid materials close to the radial blades 13, rotary conical chamber 27 and rotary cylinder 7, which cannot be captured by the rotary helical device 6, because the rotary front base disc 14 has closed portions. With the difference in angular velocity between the rotary front base disc 14 and the radial blades 13, the granular solid materials pass through the passageway opening 15 and are captured by the rotary helical device 6, going into the rotary cylinder 7, the magnitude of opening of the passageway 15 will limit the entry of the granular solid materials. It should be pointed out that the processing capacity of the machine 1 is defined by the characteristics of its motor, mechanical resistance, among other factors.

FIG. 2 illustrates a machine 1 that further comprises a driving mechanism 4, operatively associated to the centrifuging mechanism 3, configured to provide adjustment of angular velocities of the rotary helical device 6 and of the rotary cylinder 7 around their central axes, so as to enable controlled transport of the granular solid materials by the rotary cylinder 7.

As shown in FIGS. 7 to 20 and 29, the driving mechanism 4 is associated to the centrifuging mechanism 3 by means of a first central axle 20 comprised by the machine 1. More specifically, the first central axle 20 enables association of the rotary helical device 6 to the driving mechanism 4.

Preferably, the driving mechanism 4 comprises a motor, pulleys, gears, chains, belts and a secondary axle 28, operatively associated to each other. Such a secondary axle 28, shown in FIG. 6, is configured to aid in transmitting torque from said motor to the centrifuging mechanism 3. The driving mechanism 4 also comprises a protection box for the transmission 22, shown in FIG. 29, which involves the above-mentioned transmission and driving elements. Further, as shown in FIGS. 5 and 6, the driving mechanism 4 also comprises a stabilizing bar 32 configured to stabilize ends of the second central axle 21 and of the secondary axle 28, so as to nullify the attraction forces between these axles, which will contribute to providing a compact machine having reduced dimensions.

It should be noted that the driving mechanism 4 is configured to provide adjustment of the specific angular velocity for the rotary helical device 6 around its central axis and adjustment of specific angular velocity for the rotary cylinder 7 around its central axis. Preferably, the driving mechanism 4 is configured to adjust the angular velocity of the rotary helical device 6 by a value higher than the angular velocity of the rotary cylinder 7. It should be noted that the high processing capacity of the machine 1 takes place with greater differentials between these velocities, since the factor that accounts for the separation of the liquid is the centrifugation force. The intensity of this centrifugal force influences directly the quality of the solid-liquid separation and its correct configuration provides low mechanical damage to the centrifuged material. For instance, if the centrifugal force is smaller than the attraction force of the liquid to the solid, no separation will take place. This happens with the portion of liquid that is closest to the surface of the granular solid material. On the other hand, exposing the granular solid materials to a too high pressure may damage their cells, especially upon impact of deceleration in a relatively short space. Anyway, if a given application requires transport by throwing the material to greater heights, one can adopt a greater centrifugal force. Control of the force can be made by implementing a frequency inverter or an asynchronous motor, varying the number of poles or still by modifying the transmission relationship between pulleys. For instance, when increasing the velocity of the motor or altering the pulley relationship without altering the relationship of gears, the rotation velocity of the secondary axle 28 will also increase. As a result, two effects are obtained, namely: a greater centrifugal force and a shorter residence time of the granular solid materials under centrifugation, since the velocity of transport of the rotary helical device 6 increases as well.

Besides, the driving mechanism 4 also is configured to adjust the angular velocity of the rotary conical chamber 27 and the angular velocity of the rotary front base disc 14 at different values, to enable the adjustment of the flow of granular solid materials.

Figure 4:
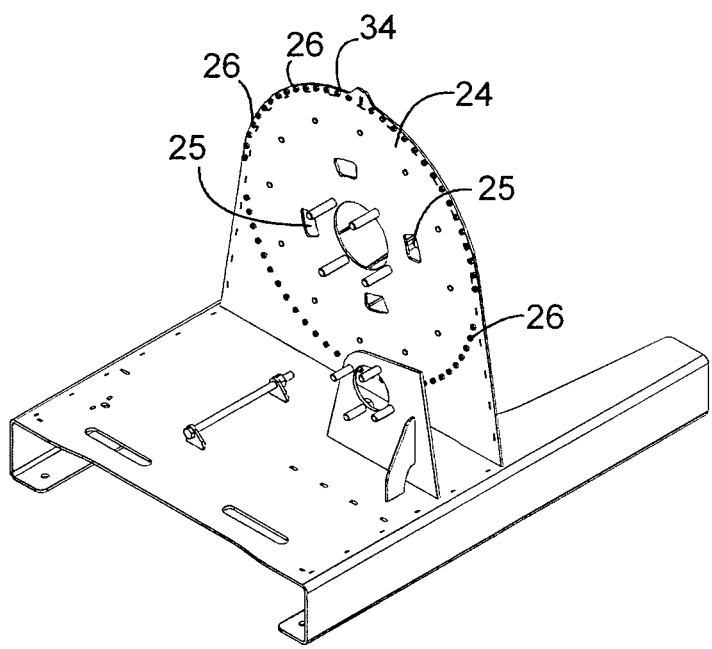
FIG. 4 represents a perspective view of an internal portion of a main chassis of the machine illustrated in FIG. 1, pointing out a fixation panel.

As shown in FIGS. 1, 2 and 3, the machine 1 further comprises a main chassis 17, capable of housing the driving mechanism 4. In addition, the machine 1 comprises a fixation panel 24, shown in FIG. 4, capable of separating the main chassis 17 from the solid collecting chamber 8. In FIG. 4, one can observe that the fixation panel 24 comprises a plurality of air-passage orifices 25, capable of alleviating the negative pressure inside the solid collecting chamber 8, thus increasing the air volume coming out together with the granular solid materials through the solid outlet duct 5, which minimizes the loss of velocity thereof due to aerodynamic friction inside the solid conducting duct 12. Additionally, the fixation panel 24 supports, from the flanging 34 with the solid collecting chamber 8, the whole collecting gears assembly formed by the solid collecting chamber 8 and by the liquid collecting chamber 16. For this reason, the need for other support points is dispensed with, which makes the machine 1 more compact and provides greater ease of approximation and integration between the source and the destination of the granular solid materials. Further, the fixation panel 24 is provided with threadable orifices 26, which, in combination with the flanging 34 of the solid collecting chamber 8, provides the capacity of turning and directing the solid outlet duct 5 in multiple directions, so as to provide high flexibility in integrating it with other pieces of equipment.

The machine 1 further comprises a liquid chute 33 arranged between the liquid collecting chamber 16 and the liquid outlet duct 23, as shown in FIG. 25. The liquid chute 33 has the function of canalizing the centrifuged liquids that are inside it and comes from the liquid collecting chamber 16. Such a liquid chute 33 can be moved angularly (FIG. 26), so as to enable better integration with the environment in which the machine 1 is installed.

Figure 8:
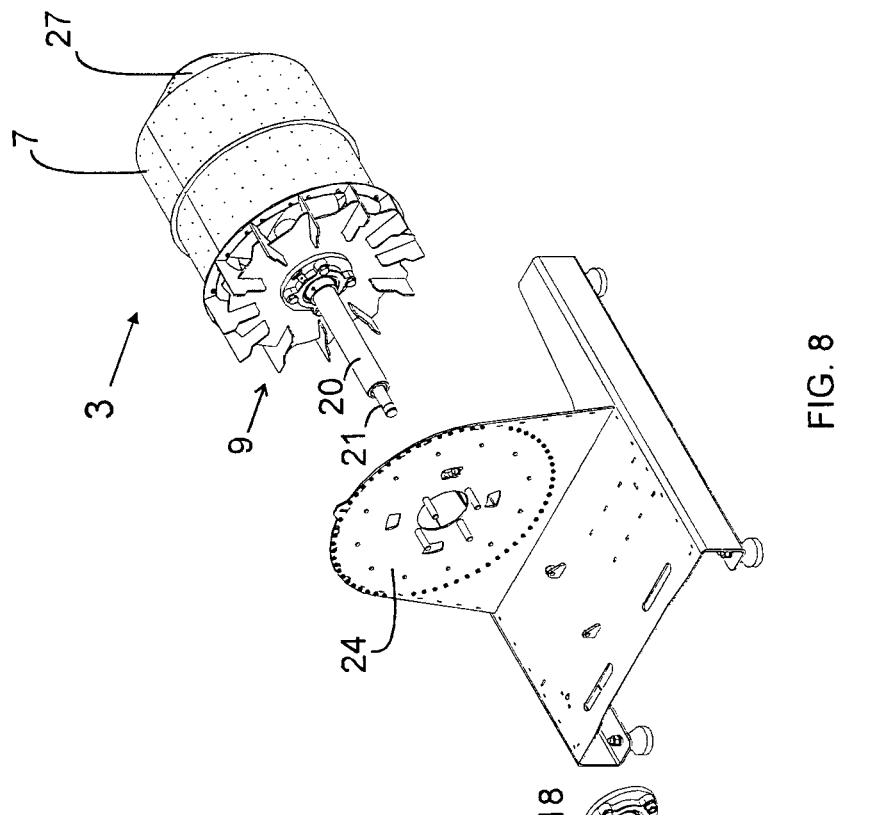
FIG. 8 represents an exploded view of the sub-assembly illustrated in FIG. 7.
Figure 7:
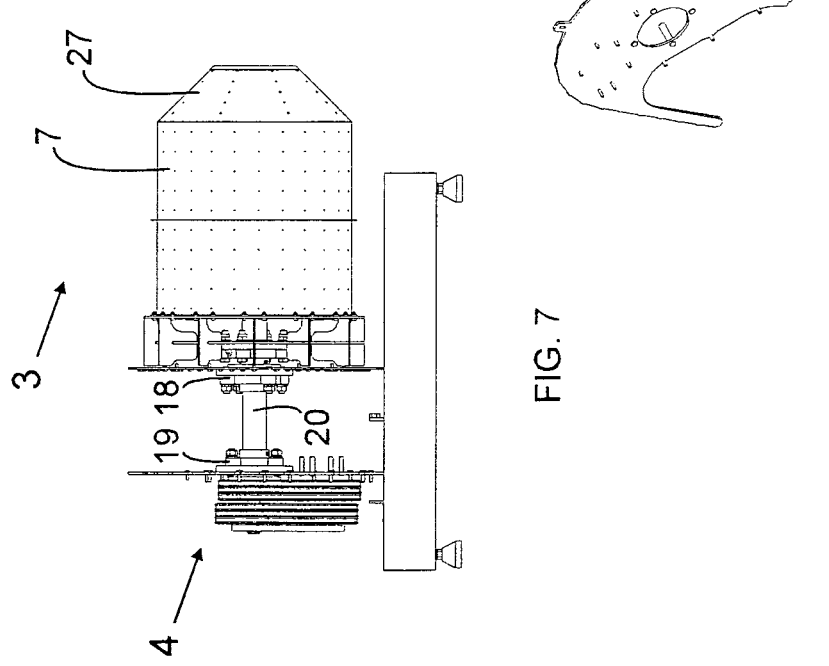
FIG. 7 represents a side view of an assembled sub-assembly of the machine illustrated in FIG. 1, which comprises the centrifugation mechanism, a support and a portion of the transmission mechanism.
Figure 17:
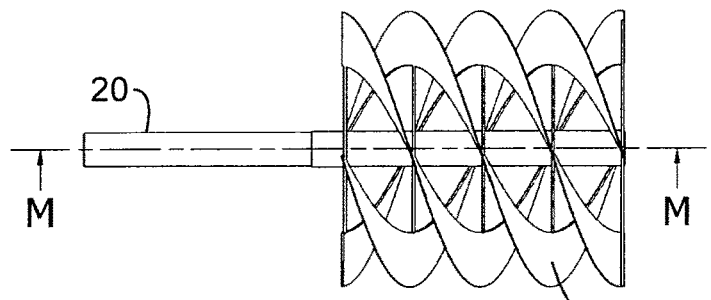
FIG. 17 represents a side view of the set of helical devices of the centrifugation mechanism of the machine illustrated in FIG. 1.
Figure 29:
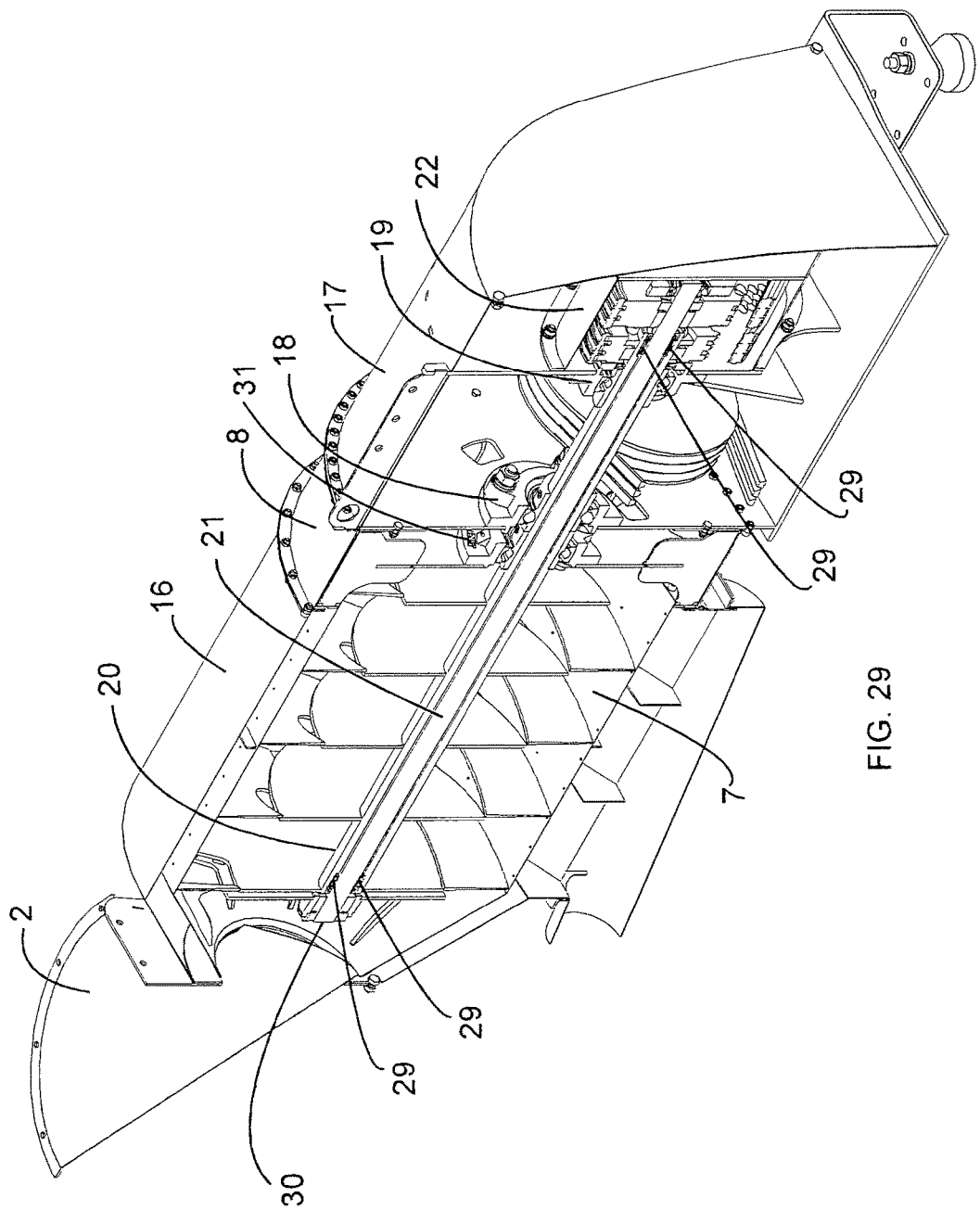
FIG. 29 represents a perspective partial view of the machine illustrated in FIG. 1, pointing out its internal portion.

Further, the machine 1 comprises a bearing assembly 18, 19, arranged inside the main chassis 17, capable of enabling support of the centrifugation mechanism 3, as shown in FIGS. 7, 8, and 29. Such a bearing assembly 18, 19 comprises first 18 and second 19 bearings fixed to the first central axle 20 to enable support of the centrifugation mechanism 3. More specifically, the first bearing 18 is positioned on the first central axle 20, adjacent the fixation panel 24. On the other hand, the second bearing 19 is positioned on the central axle 20, opposite the first bearing 18 and adjacent the transmission protection box 22 comprised by the driving mechanism 4.

The bearing assembly 18, 19 dispenses additional bearings and a specific support structure for the front portion of the machine 1, allowing free access to the hopper 2 and to the rotary conical chamber 27, so as to facilitate approximation and integration to the existing pieces of equipment, thus reducing installation costs.

According to FIGS. 8 to 14, 16 and 29, the machine 1 further comprises a second central axle 21, capable of associating the rotary cylinder 7 to the driving mechanism 4. Such a central axle 21 is arranged inside and concentrically with the first central axle 20. Further according to FIG. 29, the second central axle 21 is mounted on roller bearings 29 arranged between the first central axle 20 and the second central axle 21. The second central axle 21 has a front end 30 which, in conjunction with the solid conducting rotor 9, serves as a support for the rotary cylinder 7. Thus, one of the functions of the roller bearings 29 is to enable the solid conducting rotor 9 to turn freely on the first central axle 20.

It should be noted that the first central axle 20 and the second central axle 21 are turnable by the driving mechanism 4 independently of each other.

The machine 1 also comprises a third bearing 31, shown in FIG. 29, positioned inside the solid collecting chamber 8. The third bearing 31 is fixed to the first central axle 20 and has the function of supporting the solid conducting rotor 9 and the rotary cylinder 7 that rest on each other. In other words, the third bearing 31 is supported by the first central axle 20.

Thus, the present invention provides a continuous-flow centrifugal machine capable of removing liquids from the surface of granular solid materials in an efficient and controllable manner, which further aggregates, in an unheard-of manner, the function of multidirectional transporter, in order to enable transport of the centrifuged solid materials to variable heights and distances.

In addition, the present invention enables one to combine various parts of the machine 1 having different functionalities in the same light and compact assembly, namely: the rotary conical chamber 27 which accelerates the granular solid materials, the rotary cylinder 7, which separates them, the rotary helical device 6 which pulls them, and the solid conducting rotor 9, which provides the final thrust for throwing the centrifuged granular solid materials.

Figure 28:
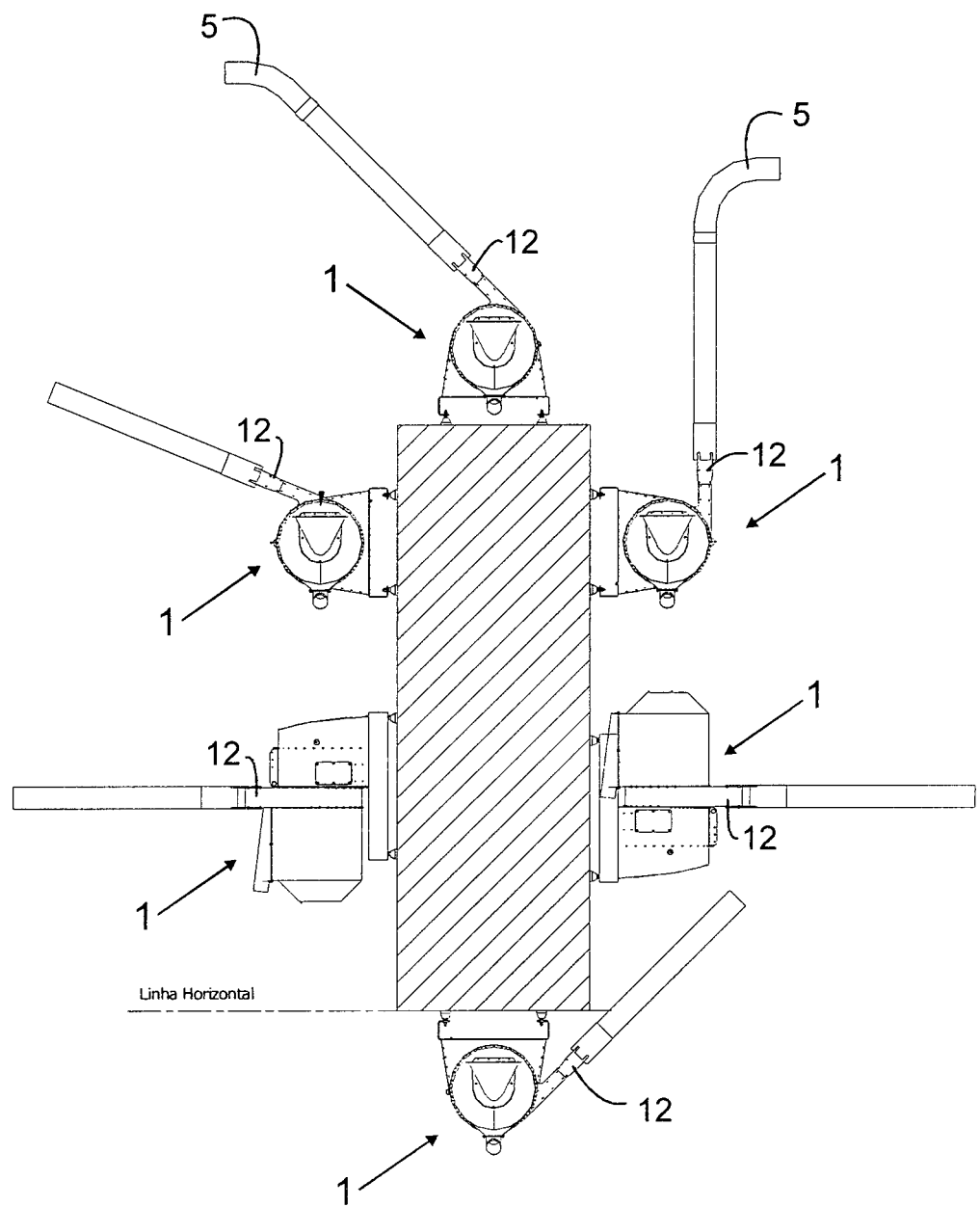
FIG. 28 represents possible positions of installation and operation of the machine illustrated in FIG. 1.

Additionally, the machine 1 of the present invention can be installed in multiple functions, as shown in FIG. 28, besides the horizontal position on the floor, which represents a great flexibility of use and adaptability to the environment in which is it installed, without impairing its efficiency in the centrifugation and transport process.

Further, the machine 1 of the present invention exhibits great capability of integration with the other external pieces of equipment that interacts with it, for example the piece of equipment that supplies (source) the granular solid materials to the machine 1 and the external piece of equipment that receives (destination) the granular solid materials from the machine 1. This integration capability results chiefly from the compact configuration of the machine 1, besides the optimized arrangement to support parts and internal pieces of the machine 1 and besides easy access to the inlet (hopper 2) and outlet (solid outlet duct 5) of the machine 1.

Finally, for better understanding of the functioning of the machine 1, we present below the operation steps carried out by it.

Centrifugation:

As already mentioned before, the material to e centrifuged by the machine 1 is a mixture comprising a solid part having granular characteristic, and a liquid part, which is external and/or permeated by the solid part, depending on its characteristics. This material to be centrifuged is called "Incoming Material" to facilitate the reading, but it can be understood as being the granular solid material having moisture.

(i) The incoming material is received in the machine 1 by the hopper 2.

(ii) The incoming material flows through the hopper 2 wall by gravity into the rotary conical chamber 27.

(iii) In the rotary conical chamber 27, the incoming material is caught by the radial blades 13 and is accelerated, thus gaining tangential velocity.

(iv) The incoming material in tangential path is caught by the internal wall of the rotary conical chamber 27, on which it exerts a centrifugal force.

(v) The incoming material, under the action of the centrifugal force, then slides over the inclined surface of the rotary conical chamber 27.

(vi) The radial blades 13, welded onto the inner surface of the rotary conical chamber 27, again catch and accelerate the incoming material continuously, since as the radius of the rotary conical chamber 27 increases, the tangential velocity increases as well.

(vii) The incoming material slides over the inner wall of the rotary conical chamber 27 towards the junction with the rotary cylinder 7.

(viii) In an end portion of the rotary conical chamber 27, close to the rotary cylinder 7, the incoming material, especially the solid part thereof, fully accelerated, can be retained by a closed portion of the rotary front base disc 14. The rotary front base disc 14, associated to the rotary helical device 6, has rotation slightly higher than the rotary conical chamber 27, which in turn is associated to the rotary cylinder 7. As the rotary front base disc 14 turns at a higher rotation than the rotary conical chamber 27, the incoming material is not retained by the closed portion of the rotary front base disc 14 and finds its passageway opening 15, to go into the rotary cylinder 7. It should be noted that the force required for moving the incoming material results also from the inclination of the end portion of the rotary conical chamber 27. This configuration enables the incoming material to be fully accelerated prior to going into the rotary cylinder 7, besides preventing a sudden overload of the incoming material from going into the rotary cylinder 7 and causing clogging of the machine 1.

(ix) Considering that the incoming material reaches the inner surface of the rotary cylinder 7, both keep the same angular velocity, remaining static with respect to each other.

(x) The liquid part of the incoming material detaches from the solid part by centrifugal force. This liquid part goes through the perforated wall of the rotary cylinder 7 through the many orifices distributed over it. The solid fragments of smaller size than the orifices will also pass through the perforated wall of the rotary cylinder 7.

(xi) The solid part of the incoming material is retained by the perforated wall of the rotary cylinder 7 and is caught by the rotary helical device 6. In this way, the end edge of the rotary helical device 6, which slides quite close to the inner wall of the rotary cylinder 7, catches the solid part of the incoming material and carries it at a deflection angle along the rotary cylinder 7, until it comes out through the back edge thereof.

(xii) The liquid part of the incoming material goes into tangential route with respect to the rotary cylinder 7 and is caught by the inner surface of the liquid collecting chamber 16.

(xiii) The liquid part of the incoming material, by force of gravity, flows over the inner surface of the liquid collecting chamber 16 as far as the lower portion where the liquid-outpour chute 33 is flanged.

(xiv) The liquid outpour chute 33 concentrates and canalizes the whole centrifuged liquid part of the incoming material.

(xv) The solid part of the incoming material, which is carried by the rotary helical device 6 along the inner surface of the rotary cylinder 7, reaches the back edge of the rotary cylinder 7, where it takes a free tangential path through the solid collecting chamber 8.

When the centrifugation phase comes to an end, the machine 1 provides increase in tangential velocity of the centrifuged material inside the solid collecting chamber 8 and uses it to transport this material directed by the outlet duct 5.

Multidirectional Transport i) The solid part of the incoming material, in a free tangential path inside the solid collecting chamber 8, it is caught by the inner surface of its wall, which is static, where it again takes circular path sliding over this surface.

ii) In this way, the solid part of the incoming material loses tangential velocity inside the solid collecting chamber 8, due to the friction with the inner surface of its wall, which is static.

iii) With the loss of tangential velocity, the solid part of the incoming material is caught by the radial blades 10 of the solid conducting rotor 9, the outer edges of which slide very close to the inner surface of the wall of the solid collecting chamber 8. Such radial blades 10 of the solid conducting rotor 9 impart greater tangential velocity to the solid part of the incoming material.

iv) The solid part of the incoming material is pushed by the radial blades 10 of the solid conducting rotor 9 over the stretch that remains until the wall of the solid collecting chamber 8 leaves its circular portion and goes on to a tangent portion.

v) At this tangent portion, the solid part of the incoming material goes into a path of escape and leaves the solid collecting chamber 8 by inertia, passes through the solid conducting duct 12 and then through the solid outlet ducts 5.

It should be noted that the vertical and horizontal distances which the solid part of the incoming material will reach are dependent on the following factors:

a) the physical characteristics of the solid part of the incoming material;

b) the rotation velocity of the rotary helical device 6, of the rotary cylinder 7, of the solid conducting rotor 9, of the radial blades 13 and of the rotary front base disc 14;

c) the outlet angle of the solid collecting chamber 8, and d) the length go the solid conducting duct 12.

A preferred embodiment having been described, it should be understood that the scope of the present invention embraces other possible variations, being limited only by the contents of the accompanying claims, which include the possible equivalents.

The invention claimed is:

1. A centrifugal machine for granular solid materials, comprising:

a centrifuging mechanism; and a hopper configured to receive granular solid materials adjacent one end of the centrifugal machine, the one end lacking any support structure so as to provide free access from the hopper and into the centrifuging mechanism;

the centrifuging mechanism comprising:

a rotary helical device having a first device end, a second device end, a device longitudinal axis, and a first central axle having a first end and a second end, the device longitudinal axis extending between the first device end and the second device end, the second device end being opposite the first device end, and the first central axle extending along the device longitudinal axis from a point adjacent the first device end to a point beyond the second device end; and a perforated rotary piece having a first piece end defining, in part, the one end of the centrifugal machine, a second piece end, a piece longitudinal axis, and a second central axle having a first end and a second end, the first end of the second central axle being opposite the second end of the first central axle, the piece longitudinal axis being aligned with the device longitudinal axis and extending between the first piece end and the second piece end, the second piece end being opposite the first piece end, the second piece end being adjacent the second device end, the second central axle extending along the piece longitudinal axis from a fixed connection point on the perforated rotary piece intermediate the first piece end and the second piece end to a point beyond the second piece end, and the second central axle being positioned internally and concentric relative to the first central axle;

a solid outlet duct positioned adjacent the second piece end of the perforated rotary piece and the second device end of the rotary helical device, the solid outlet duct providing an outlet for centrifuged granular solid materials to exit the centrifugal machine;

a rotary conical chamber arranged between the hopper and the perforated rotary piece, the rotary conical chamber being configured for receiving the granular solid materials coming from the hopper and delivering them to the perforated rotary piece, the perforated rotary piece being provided with a solid conducting rotor that is supported by the first central axle via a bearing fixed to the first central axle; and a driving mechanism remotely located relative to the one end of the centrifugal machine and independently connected to: (1) the rotary helical device via the first central axle and adjacent the point beyond the second device end to which the first central axle extends, and (2) the perforated rotary piece via the second central axle and adjacent the point beyond the second piece end to which the second central axle extends, the independent connectivity causing the driving mechanism to independently rotate the first and the second central axles, and thus the rotary helical device and the perforated rotary piece, respectively, relative to one other, wherein:

the perforated rotary piece is configured to remove, via centrifugal force, free liquids adhered to a surface of the granular solid materials;

the driving mechanism is configured to provide:

specific adjustment of angular velocity for the rotary helical device around its central axis through the first central axle; and specific adjustment of angular velocity for the perforated rotary piece around its central axis through the second central axle;

the second central axle of the perforated rotary piece, being positioned internally and concentric relative to the first central axle, causes the first central axle to, in part, support the perforated rotary piece;

the first piece end of the perforated rotary piece is fixed to the first end of the second central axle;

the second piece end of the perforated rotary piece is supported by second end of the first central axle, via the solid conducting rotor and adjacent a location intermediate and spaced apart from both the first and second ends of the second central axle; and the hopper is positioned adjacent to the first piece end of the perforated rotary piece of the centrifuging mechanism, corresponding with the one end of the centrifugal machine.

2. The machine according to claim 1, wherein the driving mechanism is configured to adjust the angular velocity of the rotary helical device by a value higher than the angular velocity of the perforated rotary piece.

3. The machine according to claim 2, wherein:

the solid conducting rotor comprises radial blades configured to provide an increase in tangential velocity of the granular solid materials;

the machine further comprises a rotary front base disc arranged between the rotary conical chamber and the rotary helical device, the rotary front base disc being provided with at least one passageway opening capable of enabling flow of the granular solid materials; and the driving mechanism is configured to adjust the angular velocity of the rotary conical chamber and the angular velocity of the rotary front base disc by different values to enable adjustment of the flow of the granular solid materials.

4. The machine according to claim 3, wherein the driving mechanism comprises a motor, pulleys, gears, chains, belts and a secondary axle, associated to each other, the secondary axle being configured to aid in transmitting torque from said motor to the centrifuging mechanism.

5. The machine according to claim 4, wherein the driving mechanism comprises a stabilizing bar configured to stabilize ends of the second central axle and the secondary axle.

6. A centrifugal machine for granular solid materials, comprising:

a centrifuging mechanism; and a hopper configured to receive granular solid materials adjacent one end of the centrifugal machine, the one end lacking any support structure so as to provide free access from the hopper and into the centrifuging mechanism;

the centrifuging mechanism comprising:

a rotary helical device having a first device end, a second device end, a device longitudinal axis, and a first central axle having a first end and a second end, the device longitudinal axis extending between the first device end and the second device end, the second device end being opposite the first device end, and the first central axle extending along the device longitudinal axis from a point adjacent the first device end to a point beyond the second device end; and a perforated rotary piece having a first piece end defining, in part, the one end of the centrifugal machine, a second piece end, a piece longitudinal axis, and a second central axle having a first end and a second end, the first end of the second central axle being opposite the second end of the first central axle, the piece longitudinal axis being aligned with the device longitudinal axis and extending between the first piece end and the second piece end, the second piece end being opposite the first piece end, the second piece end being adjacent the second device end, the second central axle extending along the piece longitudinal axis from a fixed connection point on the perforated rotary piece intermediate the first piece end and the second piece end to a point beyond the second piece end, and the second central axle being positioned internally and concentric relative to the first central axle;

a solid outlet duct positioned adjacent the second piece end of the perforated rotary piece and the second device end of the rotary helical device, the solid outlet duct providing an outlet for centrifuged granular solid materials to exit the centrifugal machine;

a rotary conical chamber arranged between the hopper and the perforated rotary piece, the rotary conical chamber being configured for receiving the granular solid materials coming from the hopper and delivering them to the perforated rotary piece, the perforated rotary piece being provided with a solid conducting rotor that is supported by the first central axle; and a driving mechanism remotely located relative to the one end of the centrifugal machine and independently connected to: (1) the rotary helical device via the first central axle and adjacent the point beyond the second device end to which the first central axle extends, and (2) the perforated rotary piece via the second central axle and adjacent the point beyond the second piece end to which the second central axle extends, the independent connectivity causing the driving mechanism to independently rotate the first and the second central axles, and thus the rotary helical device and the perforated rotary piece, respectively, relative to one other, wherein:

the perforated rotary piece is configured to remove, via centrifugal force, free liquids adhered to a surface of the granular solid materials; the driving mechanism is configured to provide:

specific adjustment of angular velocity for the rotary helical device around its central axis through the first central axle; and specific adjustment of angular velocity for the perforated rotary piece around its central axis through the second central axle;

the second central axle of the perforated rotary piece, being positioned internally and concentric relative to the first central axle, causes the first central axle to, in part, support the perforated rotary piece;

the first piece end of the perforated rotary piece is fixed to the first end of the second central axle;

the second piece end of the perforated rotary piece is supported by second end of the first central axle, via the solid conducting rotor and adjacent a location intermediate and spaced apart from both the first and second ends of the second central axle;

the hopper is positioned adjacent to the first piece end of the perforated rotary piece of the centrifuging mechanism, corresponding with the one end of the centrifugal machine; and the driving mechanism comprises a motor, pulleys, gears, chains, belts and a secondary axle, associated to each other, the secondary axle being configured to aid in transmitting torque from said motor to the centrifuging mechanism.

7. The machine according to claim 6, wherein the driving mechanism is configured to adjust the angular velocity of the rotary helical device by a value higher than the angular velocity of the perforated rotary piece.

8. The machine according to claim 6, wherein:
- the solid conducting rotor comprises radial blades configured to provide an increase in tangential velocity of the granular solid materials;
- the machine further comprises a rotary front base disc arranged between the rotary conical chamber and the rotary helical device, the rotary front base disc being provided with at least one passageway opening capable of enabling flow of the granular solid materials; and
- the driving mechanism is configured to adjust the angular velocity of the rotary conical chamber and the angular velocity of the rotary front base disc by different values to enable adjustment of the flow of the granular solid materials.

9. The machine according to claim 6, wherein the driving mechanism further comprises a stabilizing bar configured to stabilize ends of the second central axle and the secondary axle.

\* \* \* \* \*